Figure 1:
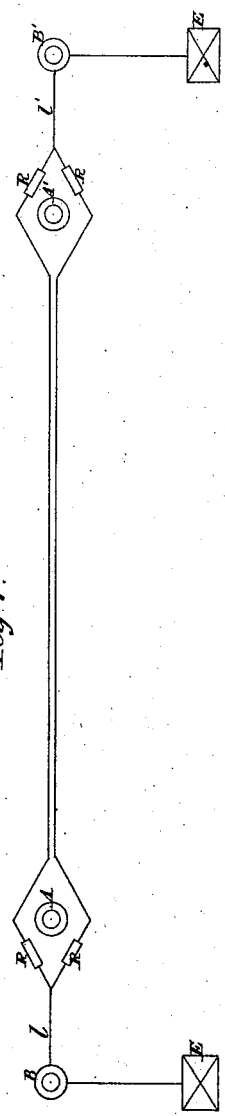

(No Model.)  3 Sheets—Sheet 1.

F. JACOB.
ELECTRIC CONDUCTOR.

No. 287,288.  Patented Oct. 23, 1883.

Witnesses:
Edw. H. Downs
F. W. Howard

Inventor
Frank Jacob
by C. S. Whitman atty (No Model.)

F. JACOB.
ELECTRIC CONDUCTOR.

No. 287,288. Patented Oct. 23, 1883.

3 Sheets—Sheet 2.

Witnesses:
Edw. H. Bowes
F. W. Howard

INVENTOR,
Frank Jacob by
C. S. Whitman
atty (No Model.)

3 Sheets—Sheet 3.

F. JACOB.
ELECTRIC CONDUCTOR.

No. 287,288. Patented Oct. 23, 1883.

UNITED STATES PATENT OFFICE.

FRANK JACOB, OF WOOLWICH, COUNTY OF KENT, ASSIGNOR TO SIEMENS BROTHERS & COMPANY, (LIMITED,) OF WESTMINSTER, ENGLAND.

ELECTRIC CONDUCTOR.

SPECIFICATION forming part of Letters Patent No. 287,288, dated October 23, 1883.

Application filed May 2, 1883. (No model.) Patented in England January 17, 1882, No. 231, and July 11, 1882, No. 3,281. in Germany July 14, 1882, No. 21,824, and in France July 15, 1882, No. 150,114.

*To all whom it may concern:*

Be it known that I, FRANK JACOB, a citizen of England, residing at Woolwich, in the county of Kent, England, have invented a new and useful Improvement in Electric Conductors, (for which Letters Patent have been obtained in Great Britain, dated January 17, 1882, No. 231, and dated July 11, 1882, No. 3,281; in France dated July 15, 1882, No. 150,114, and in Germany dated July 14, 1882, No. 21,824,) of which the following is a specification.

It is often of great advantage to employ for electrical purposes pairs of conductors, the one of each pair leading the currents to a distant instrument or apparatus and the other serving for the return-currents. When the electricity is employed to work telephonic instruments, it is particularly advantageous to employ in this manner pairs of wires and to twine them together in one cord, as this has the effect of preventing interference by induction from adjacent wires. On the other hand, when there are many sets of instruments or apparatus requiring electrical conductors, the doubling of their respective wires involves considerably increased expense, and therefore recourse is generally had to the use of the earth, instead of a return-wire, thus saving cost, but in many cases sacrificing efficiency. Now, the object of my invention is to secure all the advantages of duplicate conductors without incurring the double expense which their use involves, and this I effect by the system which I will now describe.

I will assume that there is a double wire provided for telephonic or telegraphic conduction to and from one distant instrument, which I may call A, and also a double wire following the same course for a second instrument, B. According to my invention, I work a third instrument, C, without any additional wire by simply using the double wires of the first and second instruments to complete the circuit for the third, the one pair of wires— say those for the first instrument, A—conducting the currents to the third instrument, C, and the other pair—namely, those for the second instrument, B—conducting the currents back from the third. Again, if there were four instruments, A, B, D, and E, each having its pair of wires, then the pair for A and the pair for B may serve for another, C, as above described; also, the pair for D and the pair for E may similarly serve for another instrument, F. Not only so, but the four wires so applied for C and the four wires for F may serve for another instrument, G, the result being that seven instruments are worked by eight wires. By similarly multiplying instruments, I am enabled to work approximately one instrument for each wire, retaining, nevertheless, for each instrument a pair of conductors.

In cases where the earth may, without serious objection, be used instead of the return-wire, the conductors may be somewhat differently combined. Thus an instrument, H, may have its double wire, and these two wires, with earth for return, may work another instrument, I; or, again, two instruments—such as H and J—may have each its pair of wires. The wires of H and earth may be used for K, and the wires of J and earth may be used for L; or the two pairs of wires for H and J may form a complete circuit for M, and the four wires, with earth for return, may serve for N, thus providing as many circuits as there are wires.

Figure 2:
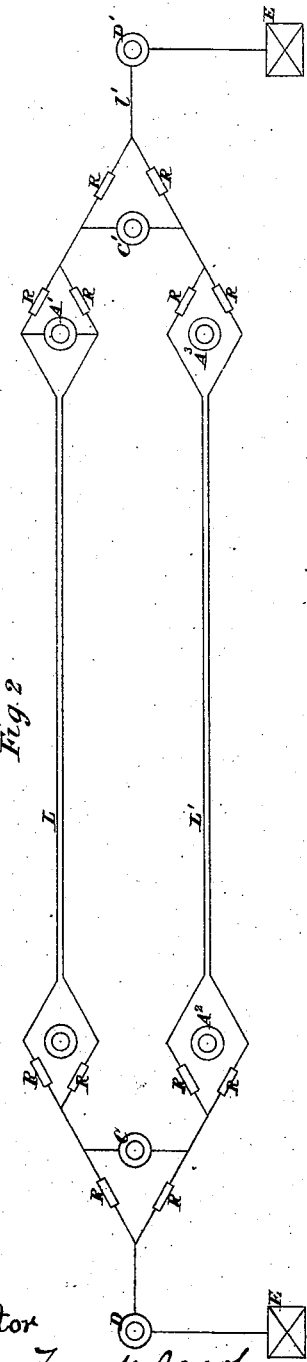

It is obvious that many other combinations might be formed in this manner, all following the same system—that is to say, whenever two wires are used in completing a single circuit, that pair may be used as a single line forming part of another circuit. Although each pair or combined set of wires may be thus made to serve in several distinct circuits, the instruments of those circuits can nevertheless be operated simultaneously without interfering with one another, as may be understood by considering the condition of the A, B, and C circuits above described as the first illustration of the application of my system. I will suppose that the A circuit is in use, an electrical current passing forward along one of its wires and returning by the other, and that at this time the C circuit is brought into use by a current passing forward along the A pair of wires and back by the B pair. The effect of this additional current makes no difference in the relative condition of the two A wires, for by whatever positive potential it may increase the already positive potential of the one wire, it by the same amount diminishes the negative potential of the other, so that the difference of potential of the two wires remains the same as before, and therefore the effect on the instruments operated by them is unchanged. In like manner when a greater number of circuits are connected, as above described, each circuit remains uninfluenced by currents passing through both its wires to serve other circuits. In circuits thus connected the non-interference of each pair of instruments with the others is effected by bridge-connections with resistances or condensers, or combinations of these. As an example of this arrangement, I may refer to Figure 1, in which two instruments or apparatus, A and A', are connected together by a double line of wires, L. Two other instruments, B and B', may be connected together in the manner indicated by a conducting-line made up of the single portions $l\ l$ (which may be of any length) and of the double line L, the earth being used for return. The conductors are arranged to form a bridge for each of the instruments A A' with resistances R or condensers, or both, in the limbs of the bridge, so as to determine equality of potential on each side of A and A'. Fig. 2 illustrates my system of connecting for four pairs of instruments. Two pairs, A A' and $A^2\ A^3$, are connected by their double wires L L'. These double wires form the circuit for a pair, C C', and the four wires of L and L', with earth for return, form the circuit for the fourth pair, D D'.

Figure 3:
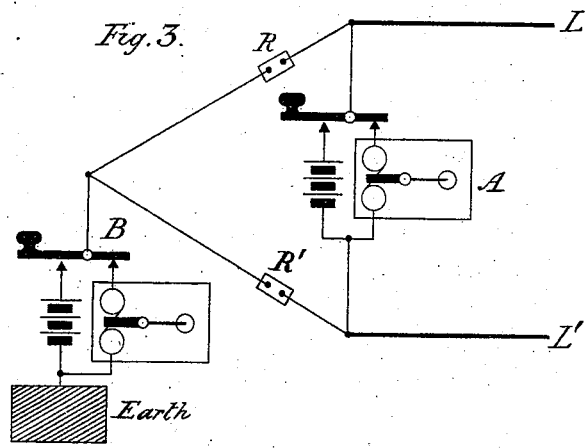
Figure 4:
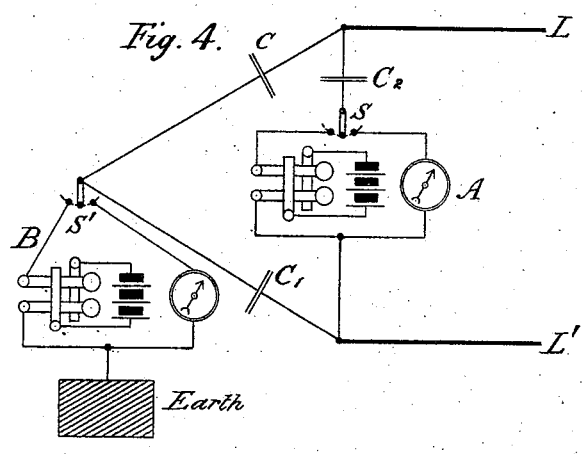
Figure 5:
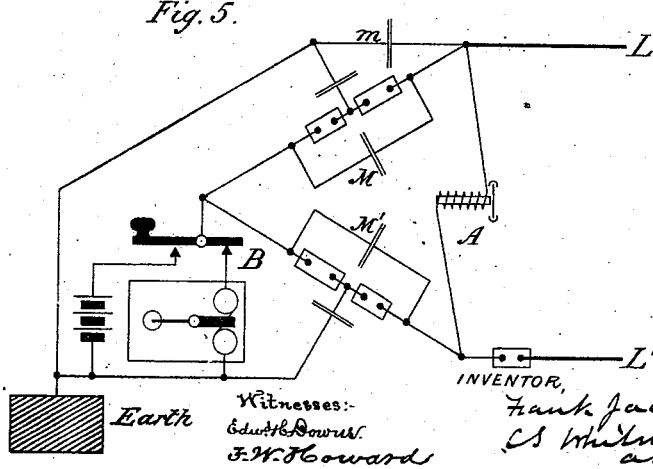

Figs. 3, 4, and 5 illustrate various ways of connecting different kinds of instruments at one of the stations, similar connections being made in each case at the other station. Fig. 3 illustrates the connections for ordinary direct-working Morse recorders or sounders. A works through the complete circuit of the lines L L', B works through L L', together with earth for return, the balance being effected by properly-adjusted resistances R R'. Fig. 4 illustrates connections for single needle or galvanometer reflecting-instruments, the balance being effected by condensers C C'. The condenser $C^2$ may be used or not as in the ordinary working of submarine cables. The switches S S' serve, as usual, to connect the line to the sending-key or to the receiving-instrument. In Fig. 5 a magnetic telephone, A, is on the complete circuit L L', and an ordinary Morse instrument, B, is worked through L L' as one line, with earth for return, the balance being effected by a combination of resistances and condensers at M M' and $m$.

Figure 6:
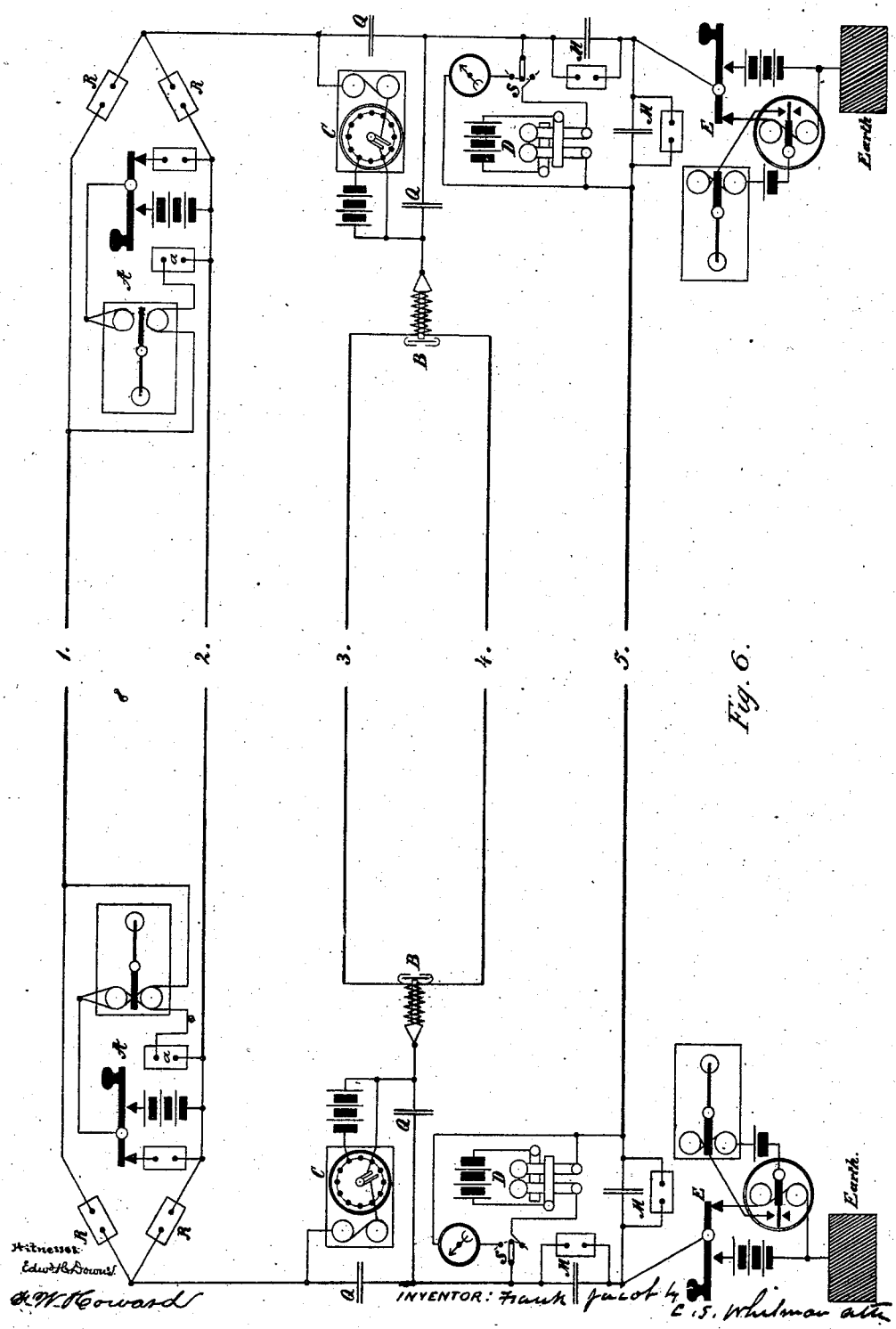

Fig. 6 illustrates the method applied to five lines so as to work four pairs of instruments without material interference. The lines 1 2 form complete circuit for duplex Morse instruments, A having the artificial line $a$. The lines 3 4 form complete circuit for magnetic telephone B. The lines 1 2 form one conductor and 3 4 form the other conductor for Hughes' type-printers C, the balance on 1 2 being obtained by resistances R, and the balance on 3 4 by duplex casting of B. By 1, 2, 3, and 4 together as one line, and 5 as the other, there is a complete circuit for single needle or mirror instruments D, having switches S for connecting line to sending-key or to receiving-instrument in the usual way. The balance is in this case effected by condensers Q. Finally, with the five wires altogether as one line, and earth for return, relays E work local sounders, the balance being effected by a combination of resistances and condensers at M M'. The balance at the two ends of a pair of lines may be obtained by different means. For example, resistances may be used at the one end and condensers at the other; or different combinations of these may be used at each end.

Figure 7:
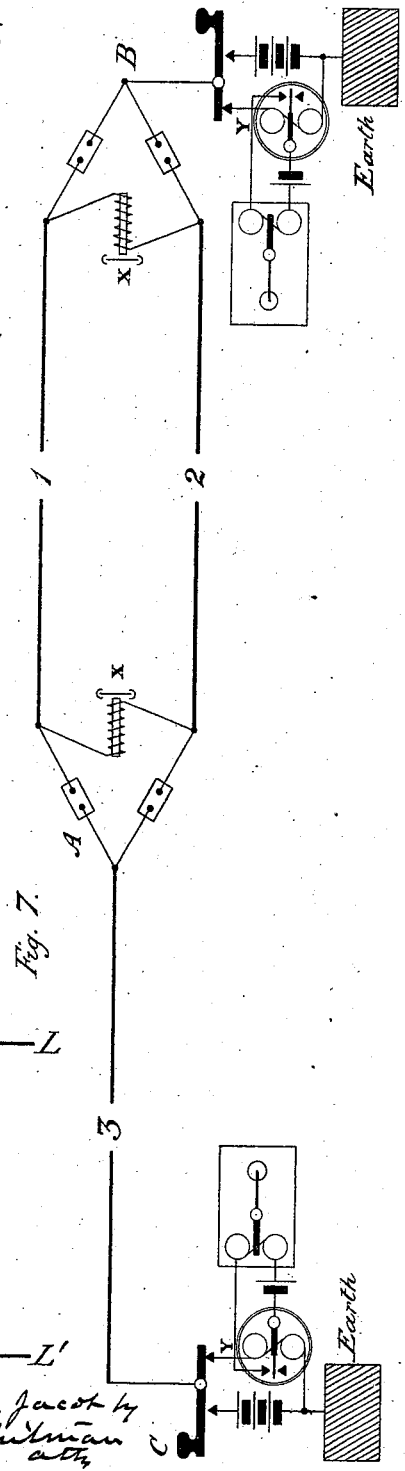

Three stations may be connected, as illustrated by Fig. 7, in which telephones X are worked by 1 2 in complete circuit, and the points A and B are connected to relays Y, working local Morse instruments, either or both of these being at a distance, as indicated at C, connected to B by a single line.

Having thus described the nature of my invention and the best means I know of carrying it into practical effect, I claim—

1. The within-described improvement in telegraphic circuits, which consists in the combination of double connecting-lines joining two stations, each of said double lines constituting a complete or distinct wire circuit in itself, and both together an independent direct or earth circuit, whereby said circuits may be utilized for two or more distinct sets of instruments.

2. At each end of a double or multiple line consisting of two or more conductors which connect in complete circuit an electrical instrument or apparatus at one station with an instrument or apparatus at another station, the combination therewith of an additional instrument or apparatus with a bridge-connection and resistance, or the equivalents thereof, whereby the said double or multiple line is made to serve as a single connecting-line for the additional instruments or apparatus without interfering with those for which it forms the complete circuit, substantially as and for the purposes set forth.

In testimony whereof I have signed my name to this specification, in the presence of two subscribing witnesses, this 13th day of April, A. D. 1883.

FRANK JACOB.

Witnesses:
JOHN LURAY,
JNO. P. M. MILLARD.

It is hereby certified that in Letters Patent No. 287,288, granted October 23, 1883, upon the application of Frank Jacob, of Woolwich, county of Kent, England, for an improvement in "Electric Conductors," errors appear in the printed specification requiring correction, as follows: In line 60, page 2, the word "materal" should read *mutual*; in line 68, same page, the word "casting" should read *coiling*; and the name of one of the witnesses to the specification should read *John Imray* instead of "John Luray;" and that the proper corrections have been made in the files and records pertaining to the case in the Patent Office, and should be read in the letters patent to make it conform thereto.

Signed, countersigned, and sealed this 5th day of February, A. D. 1884.

[SEAL.]

M. L. JOSLYN,
*Acting Secretary of the Interior.*

Countersigned:
BENJ. BUTTERWORTH,
*Commissioner of Patents.*